US010690444B2

(12) United States Patent
Davidson et al.

(10) Patent No.: US 10,690,444 B2
(45) Date of Patent: Jun. 23, 2020

(54) ADJUSTABLE LEVER FOR MAGNIFICATION SELECTOR RING, RIFLESCOPE INCORPORATING SAME AND RELATED METHODS

(71) Applicant: Revic, LLC, Cody, WY (US)

(72) Inventors: Aaron Davidson, Cody, WY (US); Andreas Schaefer, Hohenahr (DE)

( * ) Notice: Subject to any disclaimer, the term of this patent is extended or adjusted under 35 U.S.C. 154(b) by 0 days.

(21) Appl. No.: 15/964,466

(22) Filed: Apr. 27, 2018

(65) Prior Publication Data

US 2018/0313634 A1    Nov. 1, 2018

Related U.S. Application Data

(60) Provisional application No. 62/491,735, filed on Apr. 28, 2017.

(51) Int. Cl.
*F41G 1/387* (2006.01)
*F41G 1/38* (2006.01)
*G02B 7/105* (2006.01)

(52) U.S. Cl.
CPC ............... *F41G 1/38* (2013.01); *F41G 1/387* (2013.01); *G02B 7/105* (2013.01)

(58) Field of Classification Search
None
See application file for complete search history.

(56) References Cited

U.S. PATENT DOCUMENTS

| 4,789,231 | A | * | 12/1988 | Shimizu | F41G 1/38 359/422 |
| 5,930,934 | A | * | 8/1999 | Fisher | F41G 1/38 42/119 |
| 9,297,981 | B2 | * | 3/2016 | Fukino | G02B 7/021 |
| 2018/0120058 | A1 | * | 5/2018 | White | F41G 1/18 |

FOREIGN PATENT DOCUMENTS

EP    1855075 A2 * 11/2007    ............... F41G 1/38

* cited by examiner

*Primary Examiner* — Stephen Johnson
(74) *Attorney, Agent, or Firm* — Dorsey & Whitney LLP

(57) ABSTRACT

A riflescope, a magnification ring for a riflescope and related methods are set forth herein. In one embodiment, a riflescope includes a main tube having an optical axis, an eyepiece, and a magnification ring associated with the eyepiece, the magnification ring being rotatable about the optical axis. In one embodiment, the magnification ring includes a collar rotatably coupled with the main tube and a rotatable ring disposed at least partially about the collar and being selectively positionable relative to the collar at a plurality of user-selected positions. The rotatable ring is releasably fixed to the collar at any of the plurality of user-selected positions. The rotatable ring also includes a protrusion extending radially from an outer surface of the rotatable ring.

10 Claims, 9 Drawing Sheets

ADJUSTABLE LEVER FOR MAGNIFICATION SELECTOR RING, RIFLESCOPE INCORPORATING SAME AND RELATED METHODS

CROSS REFERENCE TO RELATED APPLICATIONS

This claims priority to U.S. Provisional Patent Application No. 62/491,735, filed 28 Apr. 2017, the entire contents of which is hereby incorporated by reference into this disclosure.

BACKGROUND

Firearms such as rifles are used for a variety of purposes, including for sport, military and other protective services. Oftentimes, rifles are used to shoot a target at long distances (e.g., 100 yards or more) and even very long ranges (e.g., in excess of 500 yards). In order to accommodate the sighting of a target at such ranges, riflescopes are often employed. A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle.

Some riflescopes may have a fixed focal length (meaning that the amount of optical magnification is fixed) while other riflescopes may employ a mechanism or system that enables the focal length to vary. The type of scope employed may depend, for example, on the anticipated use of the rifle. For example, if it is known that a user will be shooting at a target that is going to consistently be within a certain range, a user may select a fixed focal length scope. On the other hand, a variable focal length riflescope may provide flexibility to a user that expects to shoot their rifle under varying circumstances and where the target distance may vary significantly.

Conventional riflescopes having variable focal lengths—or variable optical magnification—may include rotatable magnification rings associated with the eyepiece of the riflescope enabling a user to select a desired magnification level of the riflescope by rotating the ring about an optical axis of the riflescope. In certain circumstances, these magnification rings may not be as easily adjustable as a user might desire depending on a variety of factors including body position and shooting conditions.

BRIEF SUMMARY OF THE INVENTION

In various embodiments of the disclosure, the present disclosure provides a riflescope, a magnification ring for a riflescope and related methods. In accordance with one embodiment of the disclosure, a riflescope is provided, the riflescope comprising a main tube having an optical axis, an eyepiece, and a magnification ring associated with the eyepiece and rotatable about the optical axis. The magnification ring includes a collar rotatably coupled with the main tube and a rotatable ring disposed at least partially about the collar. The rotatable ring is selectively positionable relative to the collar at a plurality of user-selected positions and may also be releasably fixed to the collar at any of the plurality of user-selected positions. The rotatable ring includes a protrusion extending radially from an outer surface of the rotatable ring.

In one embodiment, the collar includes a plurality of indexing structures circumferentially disposed about a radially exterior surface of the collar. In one embodiment, the indexing structures may include set points. In one embodiment, a fastener is coupled with the rotatable ring and selectively and releasably engages one of the plurality of set points to rotatable fix the rotatable ring relative to the collar.

In one embodiment, the fastener includes a set screw extending through the radially extending protrusion.

In one embodiment, the plurality of set points are substantially evenly spaced about the circumference of the collar.

In one embodiment, plurality of set points include a plurality of concavities formed in the exterior surface of the collar.

In one embodiment, the rotatable ring includes a plurality of ridges and grooves formed on an exterior surface thereof.

In one embodiment, the riflescope further includes an objective system coupled with the main tube.

In one embodiment the main tube includes a substantially annular channel formed in an outer surface thereof and wherein a guide pin is coupled with the collar and at least partially extends into the substantially annular channel.

In one embodiment, the main tube includes circumferential groove formed therein and wherein a limiting guide pin is coupled with the collar and extends through the circumferential groove.

In one embodiment, the circumferential groove extends partially about a circumference of the main tube and wherein the limiting guide pin rotates with the collar relative to the main tube such that the limiting guide pin abuts ends of the circumferential groove to limit rotation of the collar relative to the main tube to a defined range of rotation.

In accordance with another embodiment of the disclosure, a magnification ring for a riflescope is provided. The magnification ring comprises a collar configured for coupling with a main tube of a riflescope and a rotatable ring disposed at least partially about the collar. The rotatable ring is selectively positionable relative to the collar at a plurality of user-selected positions and may also be releasably fixed to the collar at any of the plurality of user-selected positions. The rotatable ring includes a protrusion extending radially from an outer surface of the rotatable ring.

In one embodiment, the collar includes a plurality of set points circumferentially disposed about a radially exterior surface of the collar and a fastener that is coupled with the rotatable ring and selectively and releasably engages one of the plurality of set points.

In one embodiment, the fastener includes a set screw extending through the radially extending protrusion.

In one embodiment, the plurality of set points are substantially evenly spaced about the circumference of the collar.

In one embodiment, the plurality of set points include a plurality of concavities formed in the exterior surface of the collar.

In accordance with another embodiment of the disclosure, a method of customizing a riflescope is provided. The method includes providing a riflescope having a main tube and an eyepiece, the eyepiece having a magnification ring configured to rotate relative to the main tube about an optical axis. A rotatable ring of the magnification ring is decoupled from a collar of the magnification ring. The rotatable ring is rotated relative to the collar while the collar remains in a fixed position relative to the main tube until a radially extending protrusion of the rotatable ring is at a first selected angular position relative to the main tube. The rotatable ring is rotatable coupled with the collar while maintaining the radially extending protrusion at the first selected angular position such that the rotatable ring and the collar rotate as a unit relative to the main tube.

In one embodiment, rotatably decoupling the rotatable ring from the collar includes disengaging a set screw from a first set point formed in the collar.

In one embodiment, rotatably coupling the rotatable ring with the collar includes engaging a second set point formed in the collar with the set screw.

In one embodiment, the method further comprises again rotatably decoupling the rotatable ring from a collar, rotating the rotatable ring relative to the collar while the collar remains in a fixed position relative to the main tube until a radially extending protrusion of the rotatable ring is at a second selected angular position relative to the main tube, and rotatably coupling the rotatable ring with the collar while maintaining the radially extending protrusion at the second selected angular position such that the rotatable ring and the collar rotate as a unit relative to the main tube.

Some aspects of the present disclosure relate to a riflescope that may comprise a main tube having an optical axis, an eyepiece connected to the main tube, and a ring associated with the eyepiece and rotatable about the optical axis. The ring may include a collar rotatably coupled with the main tube and a rotatable ring selectively positionable relative to the collar at a plurality of positions. The rotatable ring may be releasably fixed to the collar at one of the plurality of positions, with the rotatable ring having a protrusion extending radially from an outer surface of the rotatable ring.

In some embodiments, the collar may include a plurality of set points circumferentially disposed about a radially exterior surface of the collar, and a fastener may be coupled with the rotatable ring, with the fastener being selectively and releasably engageable with the collar at at least one of the plurality of set points. In some embodiments the fastener may extend through the radially extending protrusion. The plurality of set points may be substantially evenly spaced about a circumference of the collar, and the plurality of set points may include a plurality of concavities formed in the radially exterior surface of the collar.

In some embodiments, the rotatable ring may include a plurality of ridges and grooves formed on an exterior surface thereof. The main tube may include a channel, and a pin may be coupled with the collar and may at least partially extend into the channel. The collar may be rotatable relative to the main tube between a first position wherein the pin engages a first end of the channel of the main tube and a second position wherein the pin engages a second end of the channel of the main tube. The pin may be rotatable with the collar relative to the main tube.

Another aspect of the disclosure may relate to a magnification ring for a riflescope. The magnification ring may comprise a collar attachable to a main tube of a riflescope, and the magnification ring may comprise a rotatable ring disposed at least partially about the collar. The rotatable ring may be selectively positionable relative to the collar at a plurality of positions and may be releasably fixable to the collar at one of the plurality of positions, with the rotatable ring having a protrusion extending radially from an outer surface of the rotatable ring.

In some embodiments, the collar may include a plurality of set points circumferentially disposed about a radially exterior surface of the collar, and a fastener may be coupled with the rotatable ring. The fastener may be selectively and releasably engageable with the collar at at least one of the plurality of set points. The fastener may extend through the radially extending protrusion. In some arrangements, the plurality of set points may be substantially evenly spaced about the circumference of the collar. The plurality of set points may include a plurality of concavities formed in the radially exterior surface of the collar.

In some embodiments, the protrusion may include a rotational cantilever radially extending from a generally cylindrical outer surface of the rotatable ring. The rotatable ring may comprise a plurality of ridges positioned around the generally cylindrical outer surface of the rotatable ring, the rotational cantilever extending further radially from the generally cylindrical outer surface than the plurality of ridges.

Yet another aspect of the disclosure may relate to a method of customizing a riflescope. The method may comprise: providing a riflescope having a main tube and an eyepiece, with the eyepiece having a magnification ring configured to rotate relative to the main tube about an optical axis; rotatably decoupling a rotatable ring of the magnification ring from a collar of the magnification ring while the rotatable ring is in a first position relative to the collar; rotating the rotatable ring relative to the collar while the collar remains in a fixed position relative to the main tube until the rotatable ring is at a second position relative to the collar; and rotatably coupling the rotatable ring with the collar while maintaining the rotatable ring at the second position relative to the collar, wherein the magnification ring is rotatable as a unit relative to the main tube.

In some embodiments of the method, rotatably decoupling the rotatable ring from the collar may include disengaging a set screw from a first set point on the collar. In some embodiments, rotatably coupling the rotatable ring with the collar may include engaging a second set point formed in the collar with the set screw. The rotatable ring may comprise a protrusion, and rotating the rotatable ring relative to the collar may comprise grasping or pressing against a side surface of the protrusion with fingers of a hand.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Embodiments of an optical device, such as a riflescope, along with related components and methods are provided herein. According to various embodiments, a riflescope may include a selectively adjustable magnification ring. The magnification ring may include, for example, a lever or other protruding element that enables a user to easily adjust the magnification setting of the riflescope. In certain embodiments, magnification ring is adjustable relative to other components of the riflescope without altering the power or magnification setting of the magnification ring. For example, the magnification ring may be adjusted for use by either a right-handed shooter or a left-handed shooter. In some embodiments, the magnification ring may be selectively adjusted for use by a user that anticipates shooting from a particular position (e.g., prone, sitting, or standing).

Figure 1:
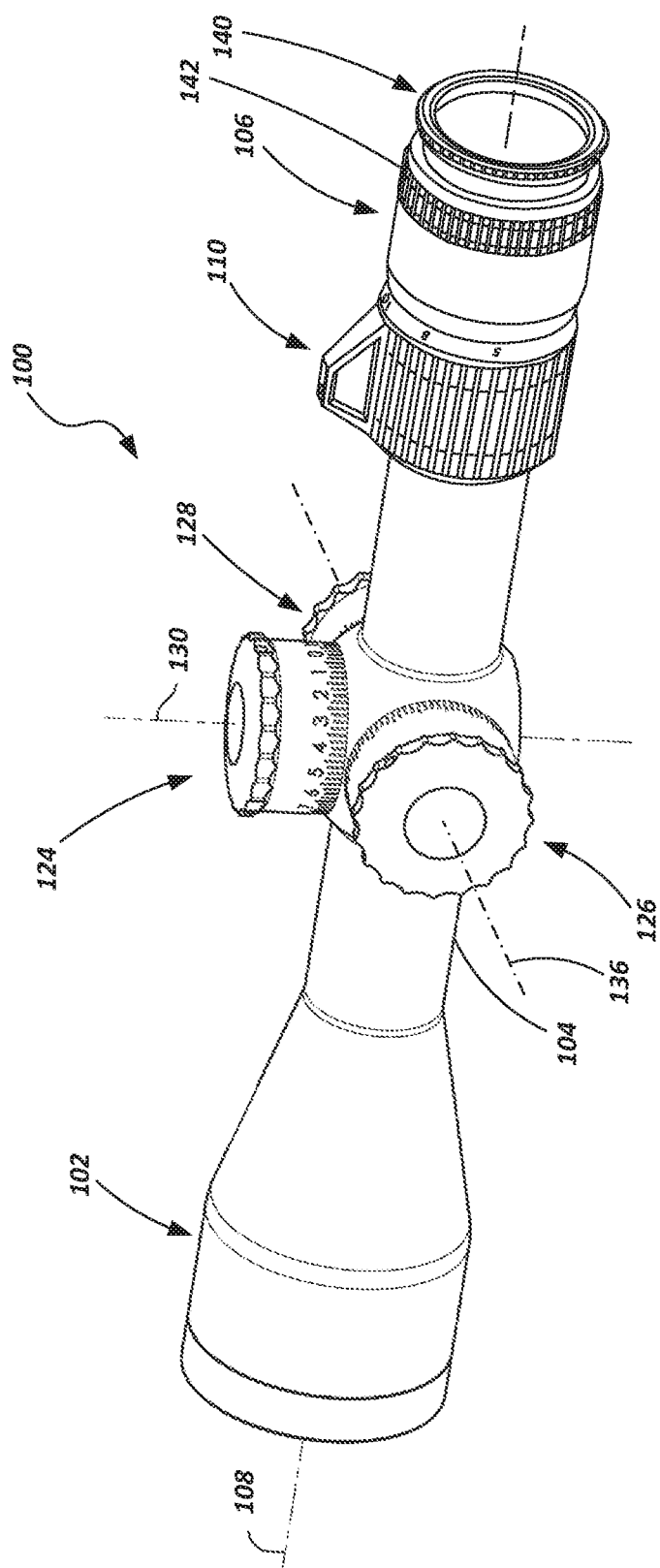
FIG. 1 is a perspective view of a riflescope according to an embodiment of the disclosure.
Figure 2:
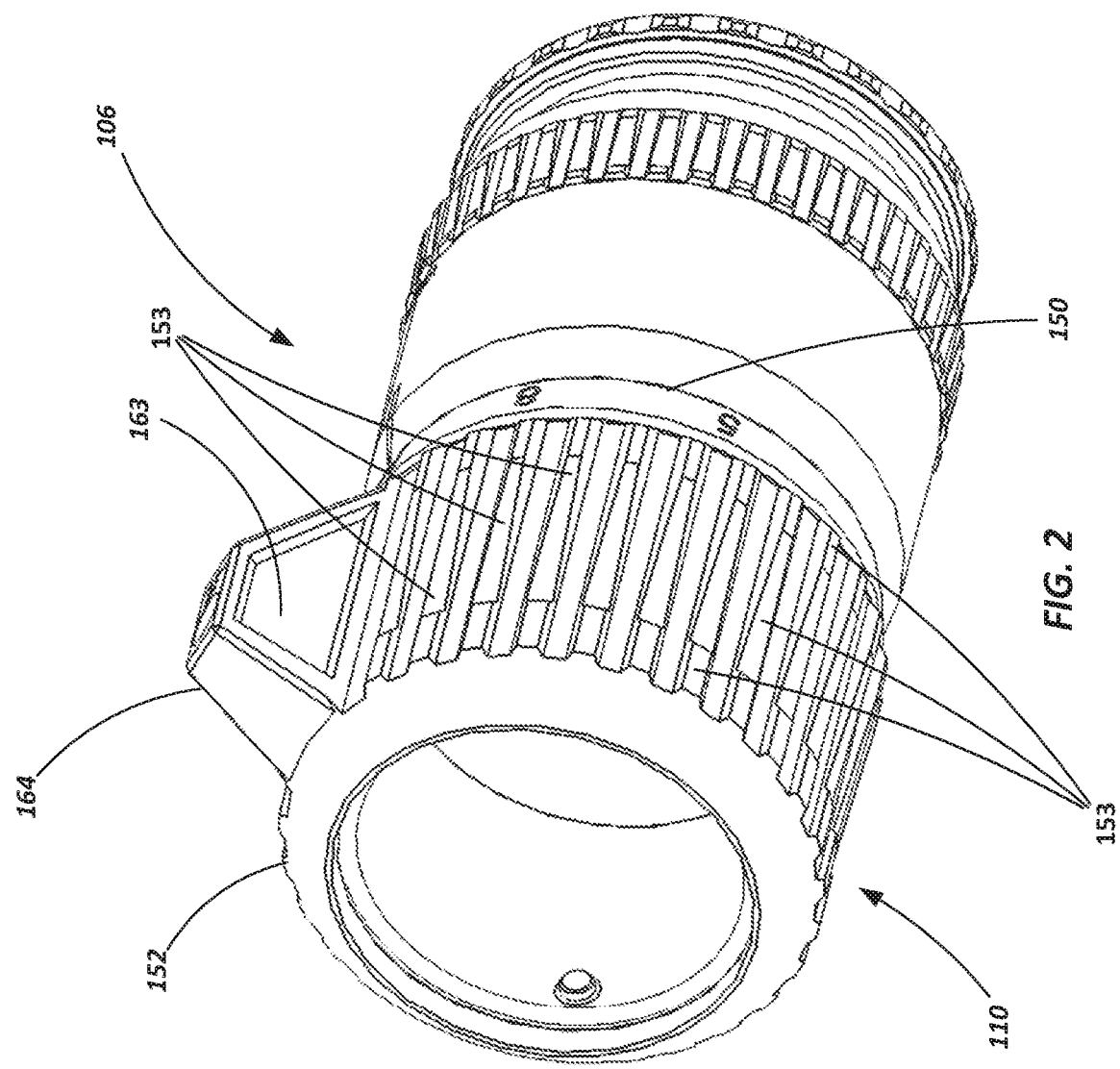
FIG. 2 is a perspective of an eyepiece for a rifle scope including a magnification ring according to an embodiment of the disclosure.
Figure 3:
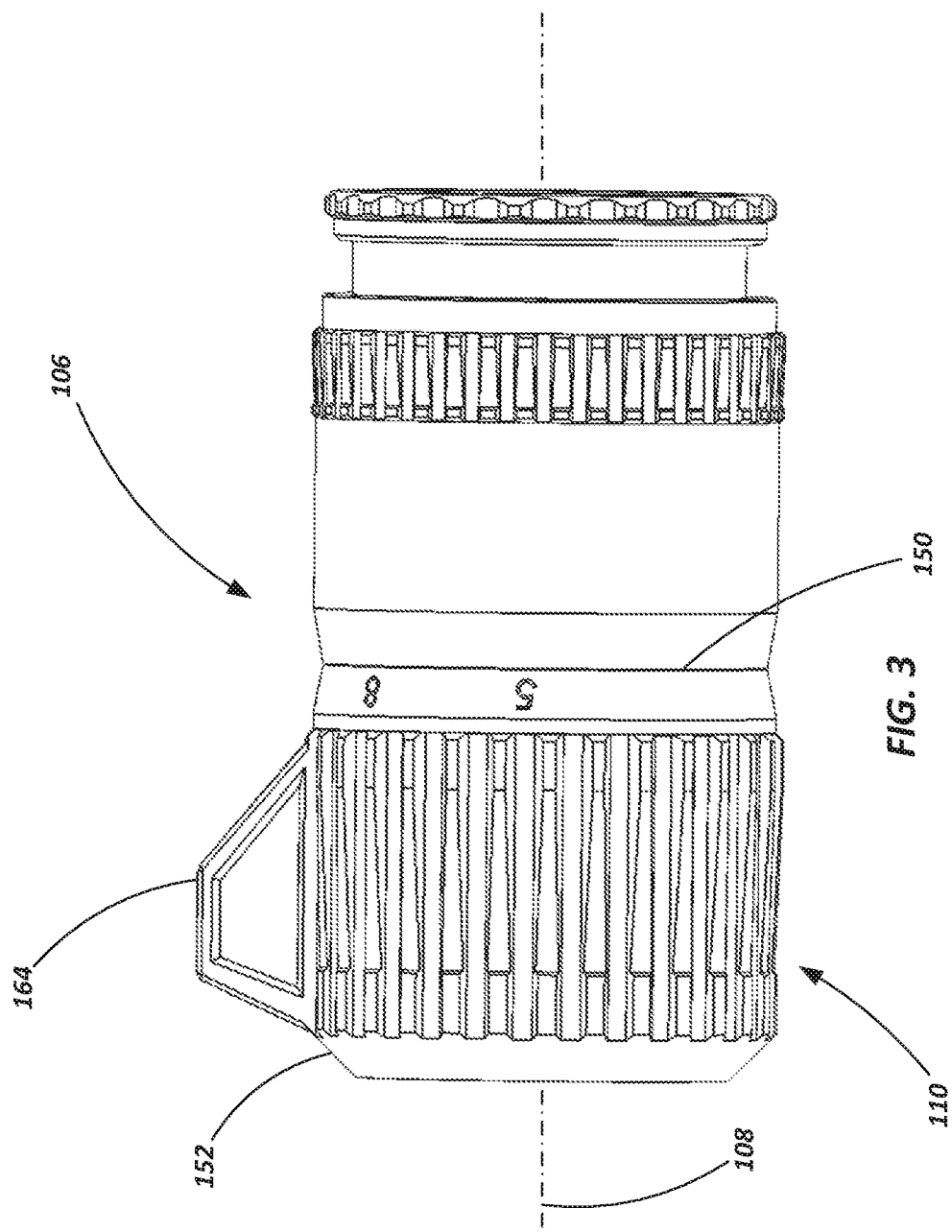
FIG. 3 is a side view of the eyepiece shown in FIG. 2.

Referring to FIG. 1, a riflescope 100 is shown in accordance with an embodiment of the present disclosure. The riflescope 100 may include an objective system 102, a main tube 104, and an eyepiece 106, including an ocular system, arranged along an optical axis 108. The objective system 102 may include one or more lenses and is positioned at the distal end of the riflescope 100 (i.e., the farthest away from a user's eye during use). The ocular system associated with the eyepiece 106 may also include one or more lenses and is located at a proximal end of the riflescope 100. A plurality of optical elements may also be disposed within the main tube 104. For example, an erector system may be contained within the main tube 104 to invert the image so that a user sees the image in a "right side up" orientation when looking through the riflescope 100.

A magnification ring 110 (also referred to as a power ring) may be associated with the eyepiece 106 to vary the magnification of the image being viewed though the riflescope 100 by adjusting the relative position of various optical elements disposed within the riflescope 100. For example, in one embodiment, the magnification ring 110 may be rotated about the optical axis 108 by a user to vary the distance of the lens (or lenses) in the ocular system relative to other lenses (e.g., those associated with an erector system) to alter the magnification or "power" of the optics, thereby enabling a user to alter their view of a target by either "zooming in" (increasing the magnification of the target) or "zooming out" (reducing the magnification of the target). The magnification range may vary from a relatively small range (e.g., about 2× magnification to about 4× magnification, meaning that the view is being magnified so that it is between 2 times larger and 4 times larger than actual size) to a relatively larger range (e.g., about 5× magnification to about 25× magnification or about 8× magnification to about 32× magnification). Of course, other ranges and powers of magnification may be used, and the magnification ring 110 of the present disclosure is not limited by the above examples.

In some embodiments, the target view seen through the riflescope 100 by a user may be overlaid with an image of a reticle (e.g., a shape or pattern providing an aiming point within the user's view) as will be appreciated by those of ordinary skill in the art. The riflescope 100 may also include a number of adjustment mechanisms including, for example, an elevation adjustment assembly 124, a parallax dial assembly 126, and a windage adjustment assembly 128. These various adjustment assemblies may also be referred to as turrets. The elevation adjustment assembly 124 may be used to adjust the vertical position of a reticle within the body of the riflescope 100 by a user rotating the elevation adjustment assembly 124 relative to the main tube 104 about a rotational axis 130. Likewise, the windage adjustment assembly 128 may be used to adjust the horizontal position of a reticle within the body of the riflescope 100 by rotation relative to the main tube 104 about a rotational axis 136. The parallax dial assembly 126 may be used to adjust target focus and/or correct parallax (e.g., such as by repositioning a focus lens) by rotation about the rotational axis 130.

In some embodiments, the eyepiece 106 may include a diopter adjustment mechanism 140 to correct for the user's vision. For example, the diopter adjustment mechanism 140, or a portion thereof, may be rotated about the optical axis 108, or otherwise adjusted, to tailor the focus of the riflescope 100 to a particular user's eyesight (e.g., to address near-sighted or far-sighted conditions). In some embodiments, once adjusted, the diopter adjustment mechanism 140 may be locked into place with a locking ring 142 or other mechanism.

Figure 4:
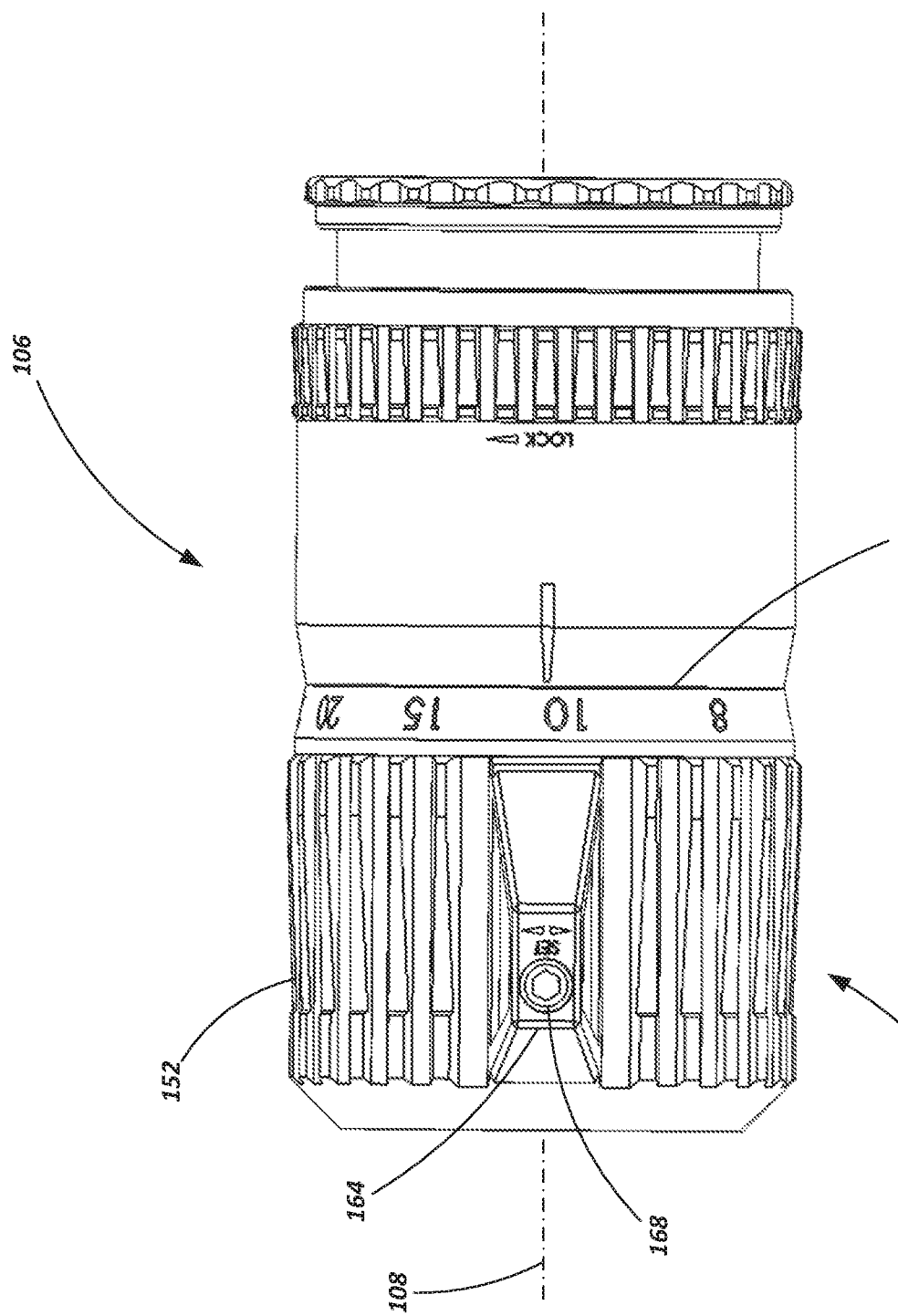
FIG. 4 is a top view of the eyepiece shown in FIGS. 2 and 3.
Figure 5:
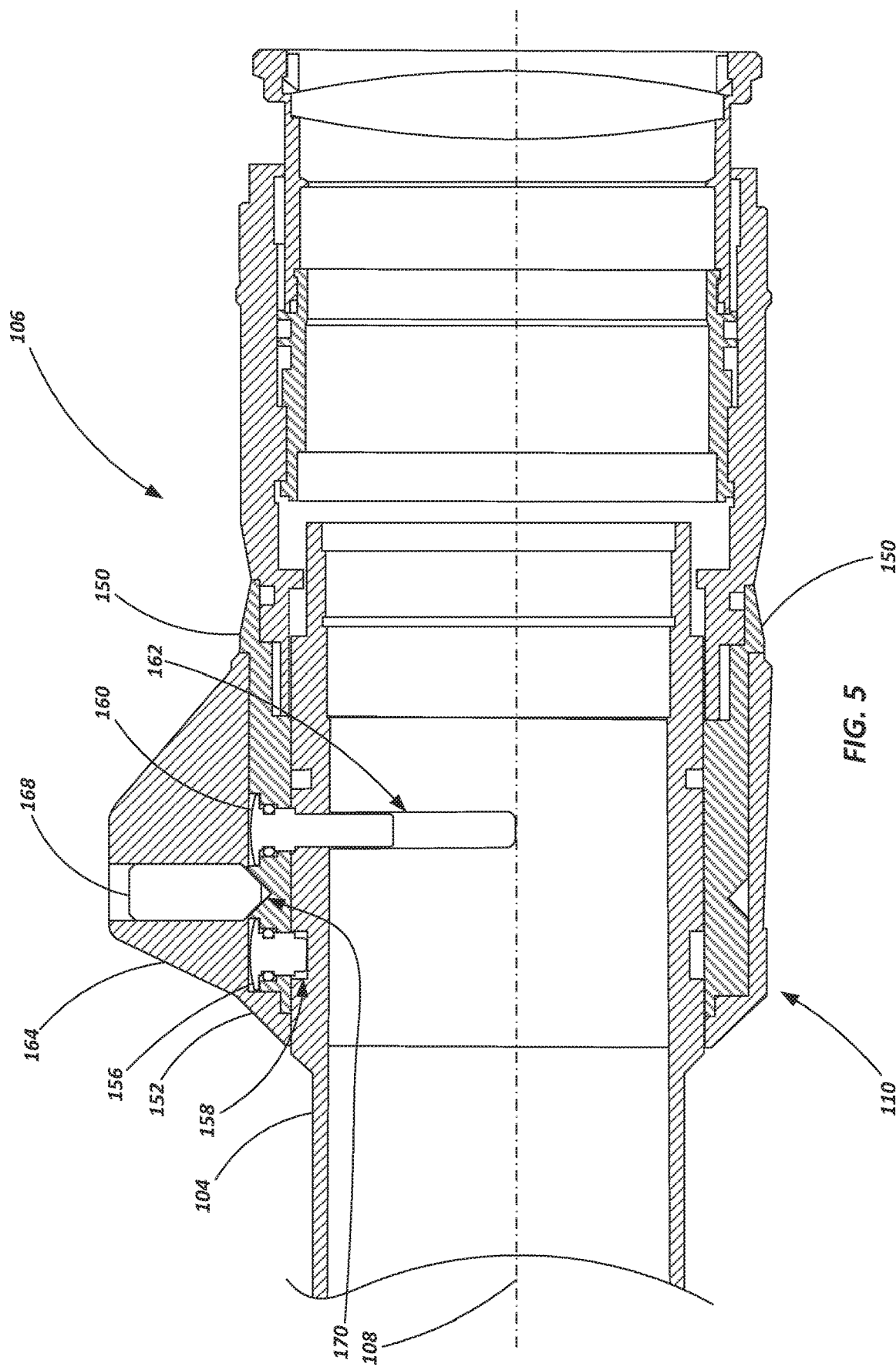
FIG. 5 is a partial cross-sectional view of a portion of the riflescope shown in FIG. 1 including the eyepiece.

Referring now to FIGS. 2-5, various views of an eyepiece 106 are shown in accordance with an embodiment of the present disclosure. As previously discussed, the eyepiece 106 may include a magnification ring 110. The magnification ring 110 may include a first component, referred to herein as a collar 150, and a second component, which may be referred to herein as a rotatable ring 152. As seen in FIG. 5, the collar 150 may be coupled with a portion of the main tube 104 of the riflescope 100. For example, as shown in FIG. 5, the collar 150 may be slid over a portion of the main tube 104 and one or more guide pins 156 may extend through the collar 150 and into an annular channel 158 formed in the main tube 104. Additionally, as shown in FIG. 5, a limiting guide pin 160 may extend through the collar 150 and into a groove 162 or channel formed in the main tube 104 that extends partially about the circumference of the main tube 104. Thus, the collar 150 may rotate about the optical axis 108 relative to the main tube 104 with the guide pins 156, 160 maintaining an axial position of the collar 150 relative to the main tube 104, and with the limiting guide pin 160 and circumferential slot 162 cooperatively defining the rotational limits of the collar 150 (and thus, the magnification ring 110) relative to the main tube 104. In one embodiment, the magnification ring 110 may rotate through a range of about 180 degrees relative to the main tube 104 when fully traveling through its limits of magnification. In other embodiments, other rotational ranges may be employed, and the above example is not to be considered limiting in any sense.

Still referring to FIGS. 2-5, the rotatable ring 152 may include a radially protruding component referred to herein as a lever 164 or protrusion. In some embodiments, the lever 164 extends radially (i.e., relative to the optical axis 108 of the riflescope 100) beyond any other portion or component of the magnification ring 110, or even beyond any other component of the eyepiece 106. In some embodiments, the lever 164 may protrude, for example, a radial distance of about ½ inch from the outer circumferential surface 166 of the rotatable ring 152. In other embodiments, the lever 164 may protrude a radial distance of anywhere between, for example, about ¼ inch and about 1 inch (or greater) from the outer circumferential surface 166. Further, the lever 164 may exhibit an axial dimension of, for example, between about ¼ inch and about 3 inches. In some embodiments, the lever 164 may exhibit a thickness of between about ⅛ inch and about ¾ inch. Other dimensions may also be implemented. The protrusion 164 may be large enough to be grasped by fingers of a hand on opposite sides of the protrusion 164, wherein the protrusion 164 may be rotated relative to the optical axis 108 by grasping the protrusion 164 or pressing a finger against one of its side surfaces to apply a torque to the rotatable ring 152.

As shown in FIGS. 2-4 and 7, the outer circumferential surface 166 of the rotatable ring 152 may also include a plurality of grooves and ridges 153 or other texture features that provide increased friction or grip to a user when grasping the rotatable ring 152. As seen in FIGS. 4 and 5, a set screw 168 or other fastener may be used to fix the rotatable ring 152 to the collar 150. In one particular embodiment, the set screw 168 may extend through the body of the lever 164 to engage the collar 150.

Rotation of the magnification ring 110, including both the rotatable ring 152 and the collar 150 (which are fixed together via the set screw 168), about the optical axis 108 may alter magnification of the view seen by a user through the riflescope 100 by displacing one or more lenses positioned within the eyepiece 106 (e.g., lens 169 in FIG. 5). The lever 164 may provide an enlarged surface, acting as a rotational cantilever for a user to apply a force by their thumb, fingers, or hand. The lever 164 may enable a user to more easily rotate the magnification ring 110 about the optical axis 108 under a variety of conditions, including various shooting positions (e.g., standing, prone, or sitting) as well as in various environmental conditions (e.g., in cold weather when the user is wearing gloves). The lever 164 may comprise a contact surface 163 that is oriented facing away from the lever 164 in a tangential direction relative to the outer circumferential surface 166. The contact surface 163 may thus extend in a direction oriented radially away from the optical axis 108. Using the contact surface 163, a torque may be easily applied further from the center of rotation of the magnification ring 110 than the outer circumferential surface 166. Accordingly, the magnification ring 110 may be more easily rotated by fingers that are large, dirty, covered, or otherwise less able to grip the outer circumferential surface 166. The contact surface 163 (and a similar contact surface positioned on the lever 164 opposite the contact surface 163) may be pressed or grasped by the fingers of a hand to move the lever 164.

The rotated orientation of the lever 164 relative to the optical axis 108 may provide a clearly visible indicator of the status of the magnification ring 110. For example, in a first position, the lever 164 (on one side of the eyepiece 106) may indicate a "zoomed out" configuration with low magnification, and in a second position, the lever 164 (on another side of the eyepiece 106) may indicate a "zoomed in" configuration with higher magnification than the first position. The first and second position may be first and second angular positions relative to the eyepiece 106, optical axis 108, or the main tube 104.

Referring to FIGS. 5-8, the magnification ring 110 may be configured to enable a user to selectively position the lever 164 at a desired orientation to satisfy the ergonomic preferences of the user under anticipated conditions. In other words, in rotating the magnification ring 110 through its range of rotation (such as defined by interaction between the limiting guide pin 160 and the limits of the groove 162), it may be desirable to set the angular position of the lever 164 relative to the collar 150 based on user preferences. For example, one user may prefer to have the lever 164 at the 9 o'clock position (when a user is looking through the eyepiece 106 as indicated by numeral 180 in FIG. 8) when the magnification ring 110 is rotated to its counterclockwise-most limit (i.e., when the limiting guide pin 160 is moved to a counterclockwise-most limit in the groove 162). In other examples, a user may prefer to have the lever 164 located between the 8 o'clock and 9 o'clock positions. Yet another user may prefer to have the lever 164 at 6 o'clock (as indicated by numeral 182 in FIG. 8) when the magnification ring 110 is rotated to its counterclockwise-most limit. These preferences may be based on preferred shooting positions of the user, based on whether the user is left-handed or right-handed, or simply based on a preferred "feel" or technique of the user. Accordingly, the lever 164 may be referred to as being selectively adjustable, wherein the lever 164 is selectively retainable in a plurality of different extreme-limit rotated positions relative to the main tube 104, optical axis 108, or another forward- or internally-positioned element of the riflescope 100 relative to the lever 164. The extreme-limit rotated positions may be positions in which the lever 164 is prevented from further rotating relative to the main tube 104, optical axis 108, or other element in at least one direction of rotation, but the lever 164 remains rotatable in the opposite direction. In some embodiments, the collar 150 may be rotatable between a first position and a second position, wherein in the first position, the pin engages a first end of the groove 162 (e.g., at end 165 of the groove 162 in FIG. 5), and in the second position, the pin engages a second end of the groove 162 (e.g., the opposite end of the groove 162 relative to end 165). The first and second ends of the groove 162 may be at the angular positions on the groove 162 about the optical axis 108 that are opposites or separated from each other.

Figure 6:
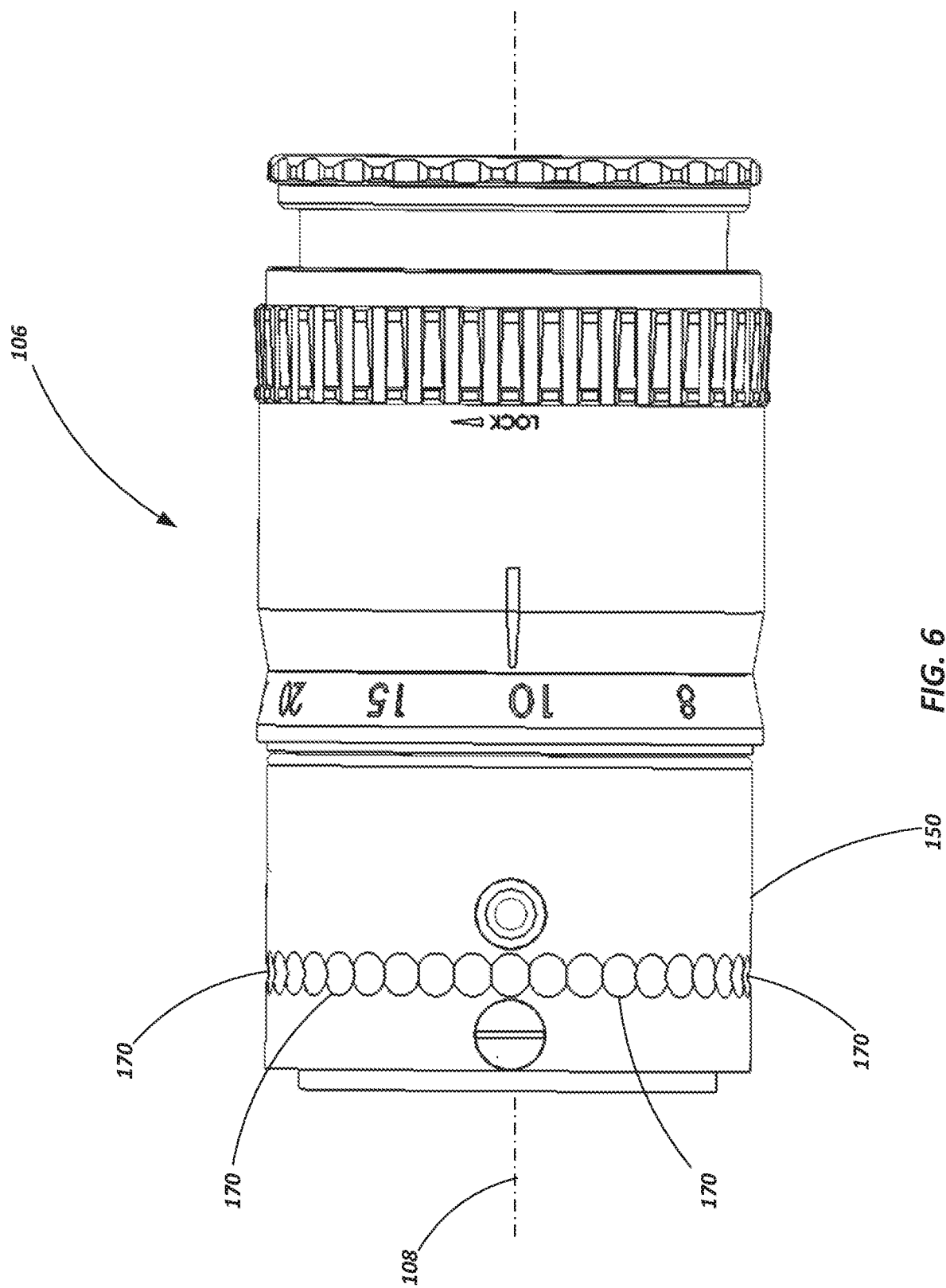
FIG. 6 is a top view of the eyepiece shown in FIGS. 2-4 with a component removed.
Figure 7:
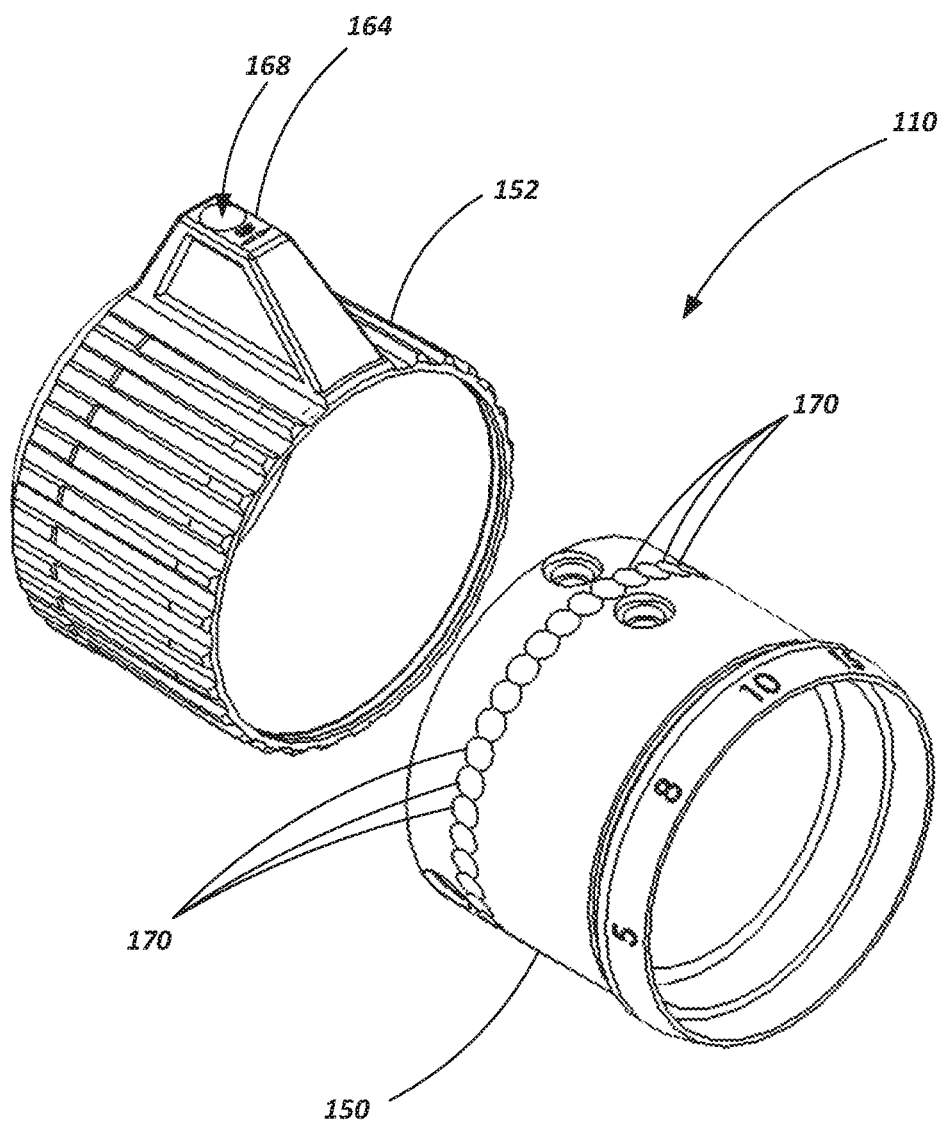
FIG. 7 is an exploded perspective view of a magnification ring assembly according to an embodiment of the present disclosure.
Figure 8:
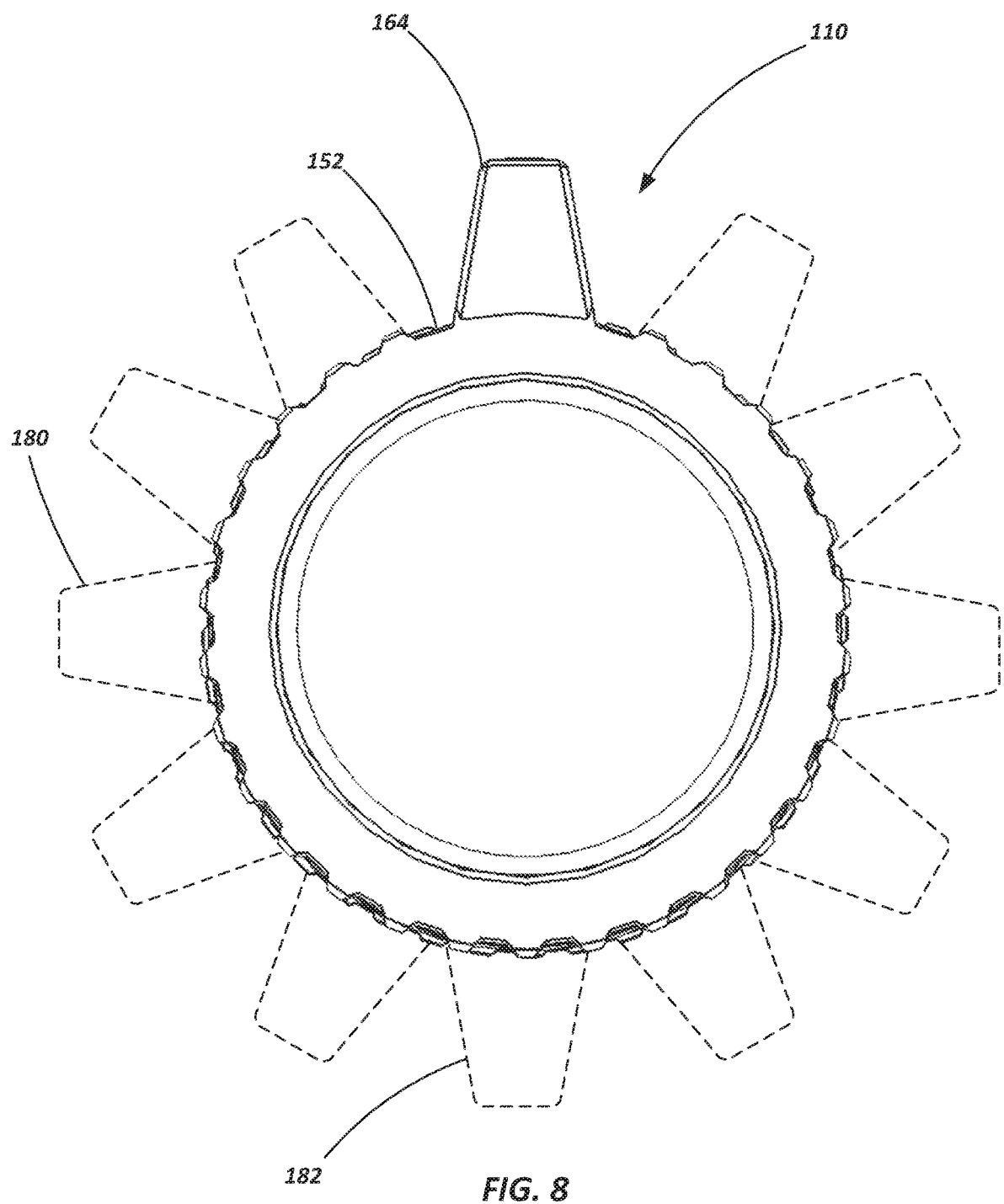
FIG. 8 is an end view of the eyepiece shown in FIGS. 2-4.

As shown in FIGS. 6 and 7, the collar 150 may include a plurality of concavities that act as set points 170 circumferentially disposed about the radially external surface 151 (see FIG. 6) of the collar 150. The set screw 168 may engage the set points 170 and may be selectively retained in set points 170. For example, a user may (1) rotate the magnification ring 110 to a desired position (e.g., the counterclockwise limit), (2) remove, or sufficiently loosen, the set screw 168 to disengage the set screw 168 from a given set point 170, (3) rotate the rotatable ring 152 relative to the collar 150 until the lever 164 is at a desired rotational position, and then (4) tighten the set screw 168 to engage a new set point 170 or concavity. Once a preferred position of the rotatable ring 152 (relative to the collar 150) is set for a specific user, the user need not further adjust the rotatable ring 152 relative to the collar 150. The rotatable ring 152 and collar 150 may then operate simultaneously as a magnification ring 110 with the lever 164 in a new user-desired position relative to the optical axis 108. Another user (or even the same user, if their preference has changed for any reason) may subsequently change the position of the lever 164 relative to the optical axis 108 in a similar manner if so desired. As seen in FIG. 8, the lever 164 may be placed at any of a number of rotational positions (e.g., through 360-degrees) by rotating the rotatable ring 152 relative to the collar 150 while the set screw 168 is loosened or removed, and then tightening the set screw 168 when the lever 164 is at a desired position. In one embodiment, thirty-six (36) different concavities or set points 170 may be equally spaced about the circumference of the collar 150. Such an arrangement enables the lever 164 to be adjusted in 10-degree increments. In other words, the lever 164 may be positioned with the set screw 168 in 36 different orientations relative to the collar 150, wherein there is one orientation for each set point 170 with the set screw 168 tightened into the concavity of a set point 170. In some embodiments, more or fewer set points 170 may be formed in the collar 150, providing different incremental levels of adjustability for the lever 164. For example, in some embodiments there may be one set point 170 for each increment of rotation around the collar 150 of about 1-degree, about 5-degrees, about 10-degrees, about 15-degrees, about 20-degrees, about 30 degrees, about 45-degrees, about 90 degrees, etc. In some embodiments, the collar 150 may not include set points 170, and the rotatable ring 152 may be infinitely, non-incrementally adjustable using the set screw 168 or another coupling mechanism (e.g., such as a cam mechanism or frictional engagement member).

Figure 9:
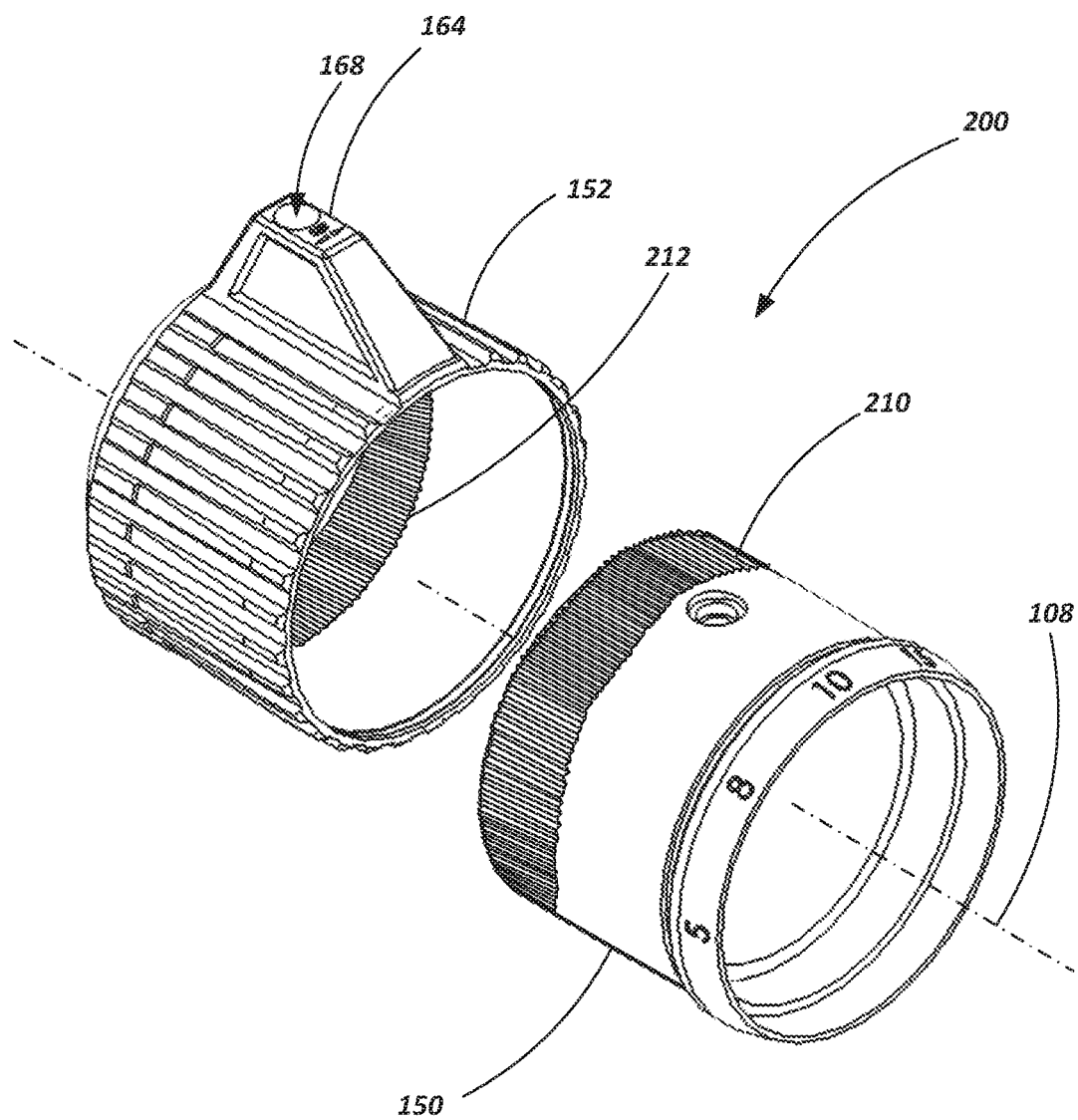
FIG. 9 is an exploded perspective view of a magnification ring assembly according to an embodiment of the present disclosure.

Referring to FIG. 9, a ring assembly 200 is shown according to another embodiment which includes a collar 150 and a rotatable ring 152. The assembly 200 may be generally configured similar to other embodiments, except that a different releasable coupling mechanism is used to adjust the position of the rotatable ring 152 relative to the collar. In some embodiments, such as shown in FIG. 9, a first set of splines or striations 210 may be formed about a circumferential periphery of the collar 150, and a second set of splines or striations 212, configured to matingly engage the first set of striations 210, are formed in an internal surface of the rotatable ring 152. Thus, in altering the positioning of the rotatable ring 152 relative to the collar 150, a set screw or other fastening mechanism may be loosened (or removed), the rotatable ring 152 may be axially slid off of the collar 150 (e.g., along axis 108), the rotatable ring 152 may be rotated to a new position relative to the collar 150 and then slid back onto the collar 150, with a set screw or other mechanism locking the two components in place relative to each other.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A magnification ring for a riflescope, the magnification ring comprising:
   a collar attachable to a main tube of a riflescope, the main tube defining an optical axis;
   a rotatable ring disposed at least partially about the collar, the rotatable ring being rotatable about the optical axis, the rotatable ring being selectively positionable relative to the collar at a plurality of positions and releasably fixable to the collar at one of the plurality of positions, the rotatable ring having a protrusion extending radially from an outer surface of the rotatable ring;
   wherein the collar includes a plurality of set points circumferentially disposed about a radially exterior surface of the collar, and wherein a fastener is coupled with the rotatable ring, the fastener being selectively and releasable engageable with the collar at least one of the plurality of set points.

2. The magnification ring of claim 1, wherein the fastener extends through the protrusion.

3. The riflescope of claim 1, wherein the plurality of set points are substantially evenly spaced about a circumference of the collar.

4. The riflescope of claim 1, wherein the plurality of set points include a plurality of concavities formed in the radially exterior surface of the collar.

5. The riflescope of claim 1, wherein the protrusion is configured as a rotational cantilever radially extending from a generally cylindrical outer surface of the rotatable ring.

6. The riflescope of claim 5, wherein the rotatable ring comprises a plurality of ridges positioned around the generally cylindrical outer surface of the rotatable ring, the rotational cantilever extending further radially from the generally cylindrical outer surface than the plurality of ridges.

7. A method of customizing a riflescope, the method comprising:
   providing a riflescope having a main tube and an eyepiece, the eyepiece having a magnification ring configured to rotate relative to the main tube about an optical axis;
   rotatably decoupling a rotatable ring of the magnification ring from a collar of the magnification ring while the rotatable ring is in a first position relative to the collar;
   rotating the rotatable ring about the optical axis and relative to the collar while the collar remains in a fixed position relative to the main tube until the rotatable ring is at a second position relative to the collar; and
   rotatably coupling the rotatable ring with the collar while maintaining the rotatable ring at the second position relative to the collar, wherein the magnification ring is rotatable as a unit relative to the main tube.

8. The method of claim 7, wherein rotatably decoupling the rotatable ring from the collar includes disengaging a set screw from a first set point on the collar.

9. The method of claim 8, wherein rotatably coupling the rotatable ring with the collar includes engaging a second set point formed in the collar with the set screw.

10. The method of claim 7, wherein the rotatable ring comprises a protrusion and rotating the rotatable ring relative to the collar comprises grasping or pressing against a side surface of the protrusion with fingers of a hand.

* * * * *